United States Patent
Jue

(10) Patent No.: US 7,453,328 B2
(45) Date of Patent: Nov. 18, 2008

(54) BANDWIDTH HIGH-POWER T NETWORK TUNER

(76) Inventor: Martin F. Jue, 500 Canterbury Rd., Starkville, MS (US) 39759

( * ) Notice: Subject to any disclaimer, the term of this patent is extended or adjusted under 35 U.S.C. 154(b) by 721 days.

(21) Appl. No.: 11/184,748

(22) Filed: Jul. 18, 2005

(65) Prior Publication Data

US 2007/0015478 A1    Jan. 18, 2007

(51) Int. Cl.
*H03H 7/38*    (2006.01)
(52) U.S. Cl. ................................................ 333/32
(58) Field of Classification Search ............... 333/32, 333/33, 81 A, 81 R, 126, 17.3; 334/78, 81–83
See application file for complete search history.

(56) References Cited

U.S. PATENT DOCUMENTS 6,816,714 B2 * 11/2004 Toncich ..................... 455/107

OTHER PUBLICATIONS

Lewis G. McCoy, "The 50-Ohmer Transmatch," *QST*, American Radio Relay League, Inc., Jul. 1961, p. 30.
Lewis G. McCoy, "The Ultimate Transmatch," *QST*, American Radio Relay League, Inc., Jul. 1970, p. 24.
"The Murch UT-2000 Ultimate Transmatch," *QST*, American Radio Relay League, Inc., Dec. 1972, p. 43.
Ulrich, L. Rohde, "Some Ideas On Antenna Couplers," *QST*, American Radio Relay League, Inc., Dec. 1974, p. 48.
Circuit diagram for Differential-T™ Tuner Nov. 2000.

* cited by examiner

*Primary Examiner*—Stephen E Jones
(74) *Attorney, Agent, or Firm*—Robert K. Tendler

(57) ABSTRACT

A wide bandwidth high-power T network tuner obtains its wide bandwidth operation by connecting a fixed capacitor between the input and ground, with the tuner using large, series connected variable capacitors for high power so as to solve the minimum capacitance problem on the higher frequencies, with the input and output matching capacitors being independent one from the other.

21 Claims, 3 Drawing Sheets

BANDWIDTH HIGH-POWER T NETWORK TUNER

FIELD OF THE INVENTION

This invention relates to antenna tuners and more particularly to a wide bandwidth high-power T network tuner.

BACKGROUND OF THE INVENTION

Antenna tuners or transmatches have been used in the past to match the output impedance of a transmitter with the impedance of an antenna. Antenna tuners come in a wide variety of forms, the most popular being either the L network or the T network tuners.

It is noted that traditional T network tuners have three controls, namely the inductor tap control, the input matching capacitor control and the output matching capacitor control. In an effort to simplify the tuning of T network tuners, MFJ Enterprises provided a so-called differential T tuner in which a ganged capacitor assembly incorporated a dual capacitor having a single shaft with two sets of stator plates to either side of the shaft such that as the rotor blades engaged one set of stators, the rotor blades associated with the other set of stators disengaged.

In order to accommodate a wide range of antenna impedances, especially for the 1.8 MHz 160 meter band, the differential T tuner required large valued input and output matching capacitance as well as a large inductor. It can be shown mathematically that for the same load and input power the differential T tuner requires larger capacitors than the traditional T network tuner for the same efficiency. Because the capacitors had to have large values, their minimum capacitance was very high when one attempted to disengage the rotators from the associated stators. Furthermore, the minimum capacitance is made even higher because the ganged capacitor is a single assembly with the edges of the two stators directly parallel to each other and in close proximity.

The inability to reduce the minimum capacitance by disengaging the rotators and stators made high impedance antenna matching impossible, especially on the 10-meter band. Thus, for the differential T tuner it was not possible to provide a broadbanded response. The problem, therefore, was how to increase the high impedance matching range for the 10-meter band for the differential T tuner. This was solved by placing a fixed capacitor across the input, the net effect of which was to lower the minimum capacitance associated with the transmitter.

This technique was, however, not applied to the traditional three-control T network tuners because traditional T network tuners did not need large capacitors as they only had to operate at relatively low power. The result of that these tuners used only low value capacitors, on the order of 250 picofarads, to provide relative broadband performance.

When using a 250-picofarad capacitor, which is a relatively small capacitor, the minimum capacitance is low when the rotor blades are completely disengaged from the stators. The construction of these two independent and separately mounted capacitors are such that the rotor and stator plate edges of one variable capacitor while parallel to the rotor and stator plates of the other capacitor are nonetheless staggered relative to each other instead of directly across from each other in the differential T tuner capacitor assembly thus reducing the minimum capacitance. Also, since the traditional T tuner uses two independent and separate capacitors connected in series, the minimum capacitance is reduced by half. Thus matching on the 10-meter band was not a problem.

As a result, the traditional low-power T network tuners had a good high-impedance matching range even on 10 meters and there was no need to place a capacitor across the input to extend the high-impedance matching range of the tuner.

However, due to periods of low sunspot activity prevalent in the 1980s, higher and higher powers were required in order to be able to communicate using ionospheric skip. Low sunspot activity was responsible for poor communication not only on the 20-meter bands and higher, but also on the lower 40-, 80- and 160-meter bands. Thus, with low sunspot activity even marginal communication could not take place unless one doubled or tripled the output power of the transmitter. This meant that transmitters exceeding 1,000 watts and often in foreign countries exceeding 5,000 watts were used in an attempt to counter the poor propagation.

The problem with such high power outputs for the transmitters was that the power ratings of the tuners needed to move up dramatically. One therefore needed to build very high-power antenna tuners. The problem in so doing was that at 160 meters, namely at 1.8 MHz, matching to low impedances required exceptionally large input matching capacitors. For instance, to match a low impedance of 12.5 ohms, one needed to markedly increase the value of the output matching capacitor to reduce losses. In many instances the value of the capacitors had to either double or quadruple.

While the use of extremely large capacitors solved the low impedance matching problem at 160 meters, the capacitors were so large that the associated minimum capacitance was unacceptable on 10 meters.

The net result is that for high-power T network tuners, in order to reduce losses at 160 meters, one would not tune high impedances at 10 meters. Since these tuners could not be used on 10 meters, people tended to use the lower power tuners, which they regularly burned out because of the high losses at 160 meters.

By way of further background, to reduce tuner losses at 160 meters, one had to provide relatively large capacitors of up to 1,000 picofarads. Minimum capacitance of such input matching capacitors was well above 100 picofarads or about 10 percent of its maximum capacitance, totally unsatisfactory for high impedance matching at the higher frequencies. Thus, while moderate power antenna tuners were available that could barely meet the legal limit of 1500 watts by using capacitors that went up to 300 picofarads, these tuners were not suitable for 160 meters when matching low impedance loads due to excessive losses.

Especially for marine applications and for foreign and commercial applications, transmitters having outputs between 2500 and 5000 watts are regularly used. For any particular band it was not a problem to provide a specialized antenna tuner for the band. However, it became difficult to provide broadband coverage, for instance, between 160 meters and 10 meters for such high-power applications.

Note that such high-power applications include radio teletype and other types of commercial transmitting applications.

SUMMARY OF INVENTION

It has been found that in high-power tuners one can use very large capacitors and reduce the associated minimum capacitance to provide broadband coverage. As part of the subject invention, by providing a fixed capacitance of between 100-200 picofarads between the tuner's input terminal and ground, one can effectively reduce the minimum capacitance when the variable input matching capacitor is completely open. By reducing the effective minimum capacitance, one can provide a wideband high-power tuner that can match high impedances at the higher frequencies while at the same time reducing tuner losses at the lower frequencies due to the use of the oversized capacitors.

Prior T network tuners used 250-picofarad capacitors and were able to tune both 10 meters and 160 meters. However, with high power requirements the traditional T network tuner required oversized variable capacitors that solved the problem of loss reduction at 160 meters but at the same time created the problem of minimum capacitance at 10 meters. Thus the new demand for higher power antenna tuners could not be met by the traditional T network tuner.

It was found that one could use the large capacitors to reduce losses at 160 meters and still solve the minimum capacitance problem with the use of a fixed capacitor.

In so doing, it was not immediately obvious that one could adapt the technology used in the prior differential T network tuner because of the difference in physical configuration and location of the variable capacitors and due to the fact that the differential capacitor tuner inherently has a high minimum capacitance, whereas the traditional T network tuner does not.

As to the physical configuration differences in the differential capacitor tuner, the ganged capacitors interact due to the positioning of the fixed edges of the stator plates aligned one on top of the other that caused the failure of the tuner to match high antenna impedances on 10 meters. The traditional T network tuners have no interaction because the capacitors are not ganged together, the stator edges are not aligned, and because the minimum capacitance is halved due to the fact that the minimum capacitance of each capacitor is connected in series because of the series connection of the capacitors.

Secondly, as to minimum capacitance, the differential T capacitor assembly inherently has more minimum capacitance than the two separate capacitors used in the traditional T network tuner for two reasons.

This is because of the construction of the differential T capacitor. In the differential capacitor tuner the stator plate edges of each section are directly opposite, i.e., one on top of the other with opposed edges aligned with each other and facing each other. Note that the opposed stator edges are parallel to each other and in close proximity. This means that the stator plates for the two capacitors are aligned and on diametrically opposite sides of the rotor.

The construction of the normal capacitors used in the traditional T network tuner is such that while the stator and rotor plate edges are parallel when fully unmeshed they are not directly opposite from each other but are staggered or laterally offset from each other, for less interaction. This results in less capacitance.

Second, as mentioned above, since the traditional T network tuner uses two separate independent capacitors connected in series, the minimum capacitance is also connected in series. This reduces the minimum series capacitance by half.

Moreover, it can be shown mathematically that for the same load and input power the differential T tuner requires larger capacitors than the traditional T network tuner for the same efficiency. This results in higher minimum capacitance for the same efficiency and reduces the matching range on the higher bands especially on 10 meters.

To say the same thing in a different way, a differential T tuner having the same value capacitor as a traditional T network tuner will not handle as much power as the traditional T network tuner before the capacitors arc due to voltage breakdown.

Thus there are many differences between the differential and traditional T network tuners, so that one could not necessarily copy from one to the other.

Note, the most desirable quality of a differential T tuner over a traditional T network tuner is that it is quick and easy to use. There are only two knobs to adjust and for a given load there is only one unique setting of the capacitor and inductor. For the traditional T network tuner there are three knobs to adjust and there are an infinite number of settings for the capacitors and inductor for a given load so it is harder and slower to use but is much more versatile and can handle much more power.

Additionally, the action of the differential T tuner was found to be highly unusual in that for a fixed setting for the differential capacitors it was found that there were two inductor settings that were efficient in matching different antenna loads. On the other hand, this is not generally thought to be a property of traditional T tuners for which only one load can be matched by the variable inductor for a given capacitor setting.

Thus because of the unusual properties, the different physical configurations and the series connection of the traditional T network tuner, it could not be predicted that the fixed capacitor at the input of the differential T tuner could be used elsewhere.

It was found that, by providing a fixed capacitor at the tuner input of a traditional T network tuner in which the input matching capacitor and the output matching capacitor are completely decoupled and independent, good performance at 10 meters could be achieved when using large high power capacitors.

In summary, a wide bandwidth high-power T network tuner obtains its wide bandwidth operation by connecting a fixed capacitor between the input and ground, with the tuner using large, series connected variable capacitors for high power so as to solve the minimum capacitance problem on the higher frequencies, with the input and output matching capacitors being independent one from the other.

BRIEF DESCRIPTION OF THE DRAWINGS

These and other features of the subject invention will be better understood in connection with a Detailed Description, in conjunction with the Drawings, of which.

DETAILED DESCRIPTION

Figure 1:
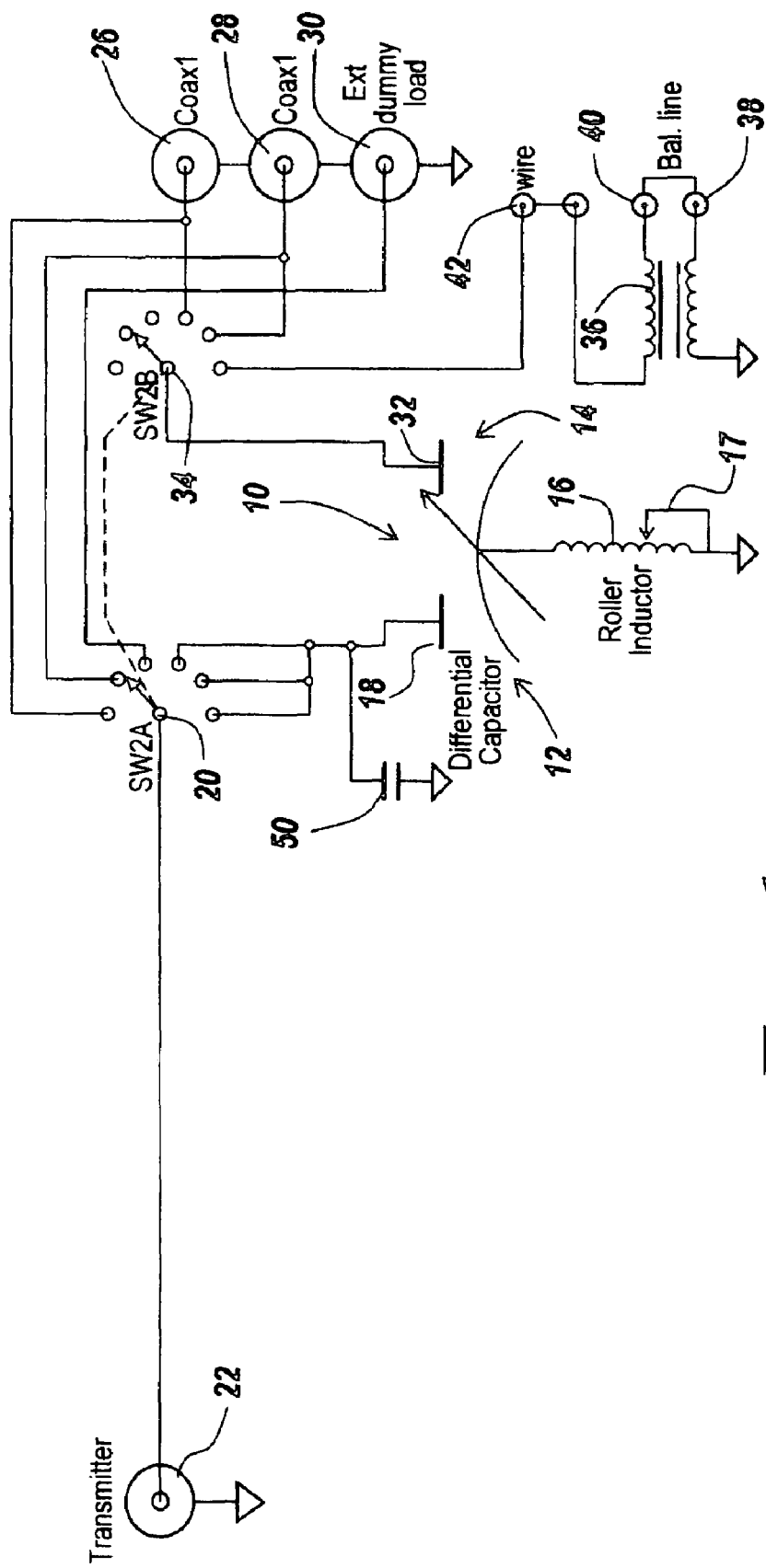
FIG. 1 is a schematic diagram of a prior art differential T tuner employing a number of shunt capacitances on the input thereto.

Referring now to FIG. 1, a schematic diagram of a differential T tuner employing multiple shunt capacitances across the input to the tuner is illustrated. Here the differential T tuner includes a differential capacitor 10, which includes a variable input section 12 and a variable output section 14. The differential nature of the tuner is such that as one moves the rotatable plates into the stator plates the input capacitance of the input capacitor section 18,12 decreases and the output capacitance section 32,12 increases. A roller inductor 16 is shown connected to the center of the rotator plates of the differential capacitor and ground, with a rolling tap 17 providing inductance adjustment.

Stator plates 18 correspond to the input capacitor stator plates, which are connected via a switch 20 to input 22.

It is noted that the upper positions of switch 20 result in a direct feed to antenna connectors 26, 28 and 30 corresponding respectively to coax 1, coax 2 and an external dummy load.

The stator plates for the output capacitor, here illustrated at 32, are coupled to a switch 34, which as illustrated is ganged to switch 20. Switch 34 connects the output stator of the differential capacitor to the various output terminals 26-30, and to a balanced line transformer 36 to accommodate balanced lines at 38 and 40. Note a long wire is coupled to switch 34 at terminal 42.

It will be appreciated that, due to cross coupling between the two sections of the differential capacitor, the minimum capacitance is complex, since the input section maximum capacitance is affected by the output section. To solve the problem, an exceptionally large capacitor 50 was coupled between the input section stator plates and ground because the differential T tuner suffers in the higher frequencies from the inability of the input capacitor portion of the differential capacitor 12 to be able to match resistive loads greater than 200 or 300 ohms. This was found to be due to the minimum capacitance associated with the use of a differential capacitor.

The differential capacitor tuner described in FIG. 1 is useful because with only two knobs, namely that controlling the differential capacitor and that controlling the roller inductor, one can theoretically tune the output impedance to the 50-ohm input impedance.

While the differential tuner has only two knobs, the inability to control separately the input capacitor capacitance and the output capacitor capacitance does not afford the flexibility to match high impedance loads to the input impedance in all circumstances.

Figure 2:
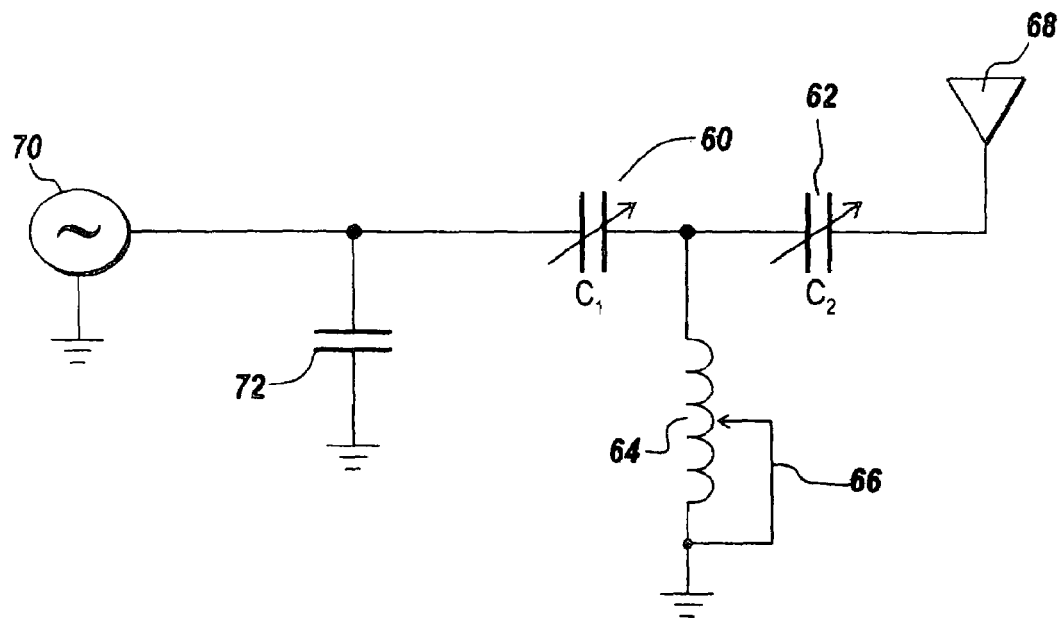
FIG. 2 is a schematic diagram of the subject traditional T tuner with a shunt capacitor across the input to improve the matching performance to high impedances so as to counteract inability to reduce the capacitance of the input capacitor.

Referring now to FIG. 2, the subject traditional T tuner has an independent variable input capacitor 60 and an independent variable output capacitor 62, with the junction thereof coupled through an inductor 64 to ground through a roller tap 66. It is noted that the output of output capacitor 62 is coupled to an antenna 68, whose impedance may not be matched to the input impedance at input 70. More particularly, for a large 500 pf or larger variable input capacitors 60, the minimum capacitance associated with the input capacitor may be too large to be able to effectively match antenna 68 to the input 70 impedance if the antenna presents a resistance load of over 300 ohms at 10 Meters.

In order to effectively lower the minimum capacitance of capacitor 60, a shunt capacitor 72 is connected between the input and ground. In a preferred embodiment, shunt capacitor 72 has one of its leads directly attached to the input terminal of the input matching capacitor, with the other of its leads connected to ground immediately adjacent the input matching capacitor. In this manner, the shunt capacitance is available directly at the input end of the input matching capacitor.

Figure 3:
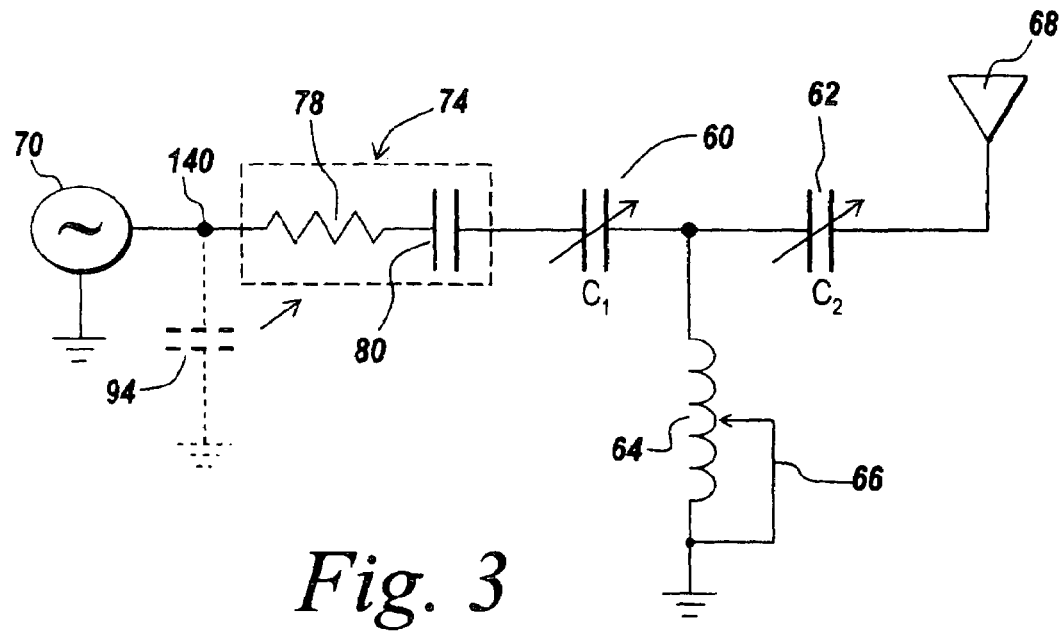
FIG. 3 is a schematic diagram illustrating the effect of the shunt capacitor to effectively provide a series capacitor in series with the input tuning capacitor; and, FIG. 4 is a graph showing the effect of using a fixed shunt capacitor across the input to increase the matchable load resistance that can be matched with the traditional T Tuner.

As described in FIG. 3, the effect of putting the shunt capacitor to ground is effectively connecting a capacitor in series with input capacitor 60, thereby lowering its minimum capacitance, which allows the traditional T tuner to match ever-increasing resistive antenna loads.

What is shown in this figure is the effect at the higher frequencies of providing a shunt capacitor across input 70 to ground. The shunt capacitor here shown in dotted outline 72 and the signal source resistance can be characterized as a series-connected RC circuit illustrated in dotted box 74, composed of a resistor 78 and a capacitor 80.

Assuming that input-matching capacitor 60 is at minimum capacitance, the effect of shunt capacitor 72 is to place capacitor 80 in series with capacitor 60. This reduces the equivalent minimum capacitance associated with capacitor 60. The result is that one can obtain excellent matching at the higher frequencies for high antenna impedance by solving the minimum capacitance problem.

Figure 4:
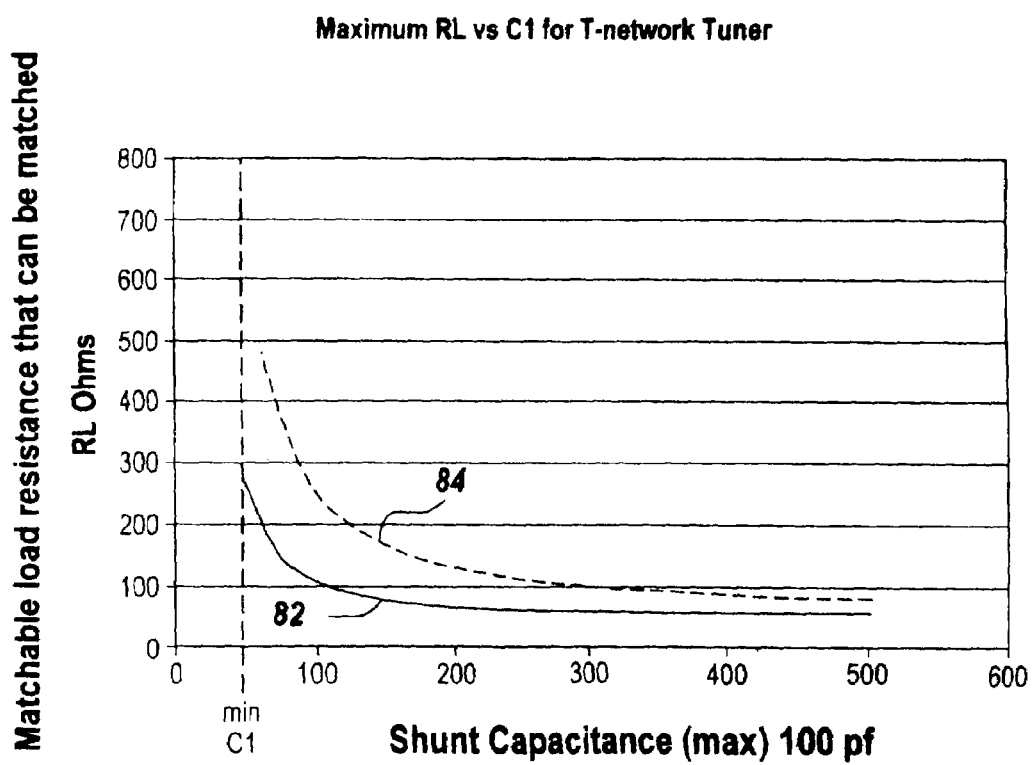

Referring now to FIG. 4, what is shown is the effect of providing a shunt capacitor across an input matching capacitor for a T network. The curve labeled 82 illustrates that for the case in which no shunt capacitance is used, the maximum load resistance matchable is less than 300 ohms when $C_1$, the capacitance of the variable input matching capacitor, is at its minimum point and the variable output matching capacitor $C_2$ is at maximum.

As shown by curve 84, when using a fixed shunt capacitor at 100 pf, the maximum load resistance matchable at $C_1$ min and $C_2$ max is close to 700 ohms. This means that using a shunt capacitor increases the maximum matchable load resistance.

What can be seen is that the introduction of a fixed shunt greatly improves the maximum resistance load that a T network tuner can match for $C_1$ min.

This provides excellent matching for high resistance loads across the entire 10-meter band. Moreover, the use of a shunt capacitance extends the high impedance matching range over the entire 160-10 meter bands, but its effect is less as the frequency is lower.

Noting that in the above example a maximum shunt capacitance of 100 pf permits matching to a 700-ohm load, increasing the shunt capacitance to 200 pf expands the top end to 1,500 ohms.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A T network tuner comprising:
    a variable input matching capacitor;
    a variable output matching capacitor connected to said input matching capacitor;
    an inductor coupled between said input and output matching capacitors to ground; and,
    a shunt capacitor between the input to said input matching capacitor and ground of sufficient value to effectively lower the minimum input capacitance associated with said input matching capacitor, thus to permit matching of high resistance loads in the upper frequencies of said tuner.

2. The tuner of claim 1, wherein said input matching capacitor has a capacitance exceeding 250 picofarads.

3. The tuner of claim 1, wherein said shunt capacitor has a capacitance in the range of 100-200 picofarads.

4. The tuner of claim 3, wherein said capacitors are large enough to support high power applications.

5. An ultra-wide bandwidth high power antenna tuner, comprising:
    interconnected independent input and output variable matching capacitors;
    a variable inductor connected between said input and output matching capacitors and ground; and, a shunt capacitor coupled between the input of said input matching capacitor and ground.

6. The tuner of claim 5, wherein said shunt capacitor has a value between 100-200 picofarads.

7. The tuner of claim 5, wherein said shunt capacitor is a fixed capacitor coupled at said input matching capacitor between the input end of said variable input matching capacitor at ground.

8. The tuner of claim 5, wherein the capacitance associated with said shunt capacitor is less than the capacitance associated with said variable input matching capacitor.

9. The tuner of claim 5, wherein the frequency range of said tuner is between 1800 KHz and 29,700 KHz, and wherein said tuner is capable of handling at least 1500 watts, whereby the use of said shunt capacitor permits use of high power variable capacitors to tune high resistive loads at the higher frequencies for which said tuner is designed.

10. In a T network tuner having independent variable input and output matching capacitors, a method for increasing the matchable resistive load for frequencies at the high tuner ranges, comprising the step of:
providing a shunt capacitor at the input matching capacitor between the input end of the input matching capacitor and ground.

11. The method of claim 10, wherein the tuner is a high power tuner and wherein the input matching capacitor to handle the high power exhibits a minimum capacitance that is too high to provide matching to high resistive loads, whereby the shunt capacitor lowers the minimum capacitance such that high valued resistance loads can be matched at the higher frequencies for which the tuner is operated.

12. The method of claim 10, wherein the input matching capacitor has a capacitance exceeding 250 picofarads.

13. A method for extending the matching range of a T network tuner having independent variable input and output matching capacitors and an inductor coupled therebetween and to ground, comprising the step of:
connecting a shunt capacitor between the input end of the input matching capacitor and ground, whereby the maximum load resistances that can be matched at is increased above that associated with the minimum input matching capacitor capacitance.

14. The method of claim 13, wherein the input matching capacitor has an input end and wherein the shunt capacitor is coupled between the input end and ground at the input matching capacitor.

15. The method of claim 13, wherein said T network tuner is a high-power tuner having a large input capacitor such that the minimum capacitance associated with said large variable input matching capacitor is such as to prevent matching high load resistance at the high frequency end of the tuner.

16. The method of claim 13, wherein the capacitance of the input matching capacitor is greater than that of the shunt capacitor.

17. The method of claim 13, wherein the shunt capacitor is a fixed capacitor and wherein the fixed capacitor has a power rating capable of handling high power outputs from a transmitter.

18. The method of claim 13, wherein the shunt capacitor has a capacitance between 100 and 200 picofarads.

19. The method of claim 18, wherein the input matching capacitor has a capacitance of at least 250 picofarads that has a minimum capacitance too large to permit matching of high resistive loads.

20. The method of claim 19, wherein the maximum resistive load matchable without using the shunt capacitor is 300 Ohms.

21. The method of claim 20, wherein the resistive load matchable using the shunt capacitor exceeds 700 Ohms.

* * * * *